No. 817,412. PATENTED APR. 10, 1906.
A. BAILLOT.
CUPOLA.
APPLICATION FILED JUNE 6, 1905.

2 SHEETS—SHEET 1.

WITNESSES:
Max V. Ordmann
Estelle V. Wale

INVENTOR
Alphonse Baillot
BY
Max V. Ordmann
ATTORNEY

No. 817,412. PATENTED APR. 10, 1906.
A. BAILLOT.
CUPOLA.
APPLICATION FILED JUNE 6, 1905.
2 SHEETS—SHEET 2.
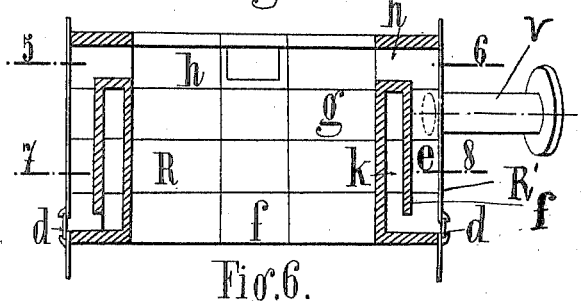
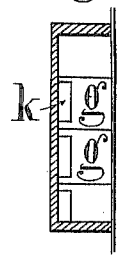
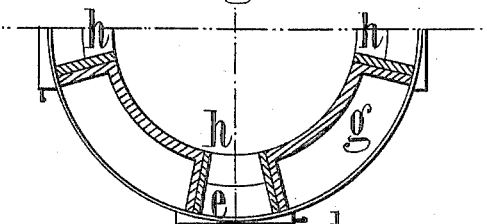
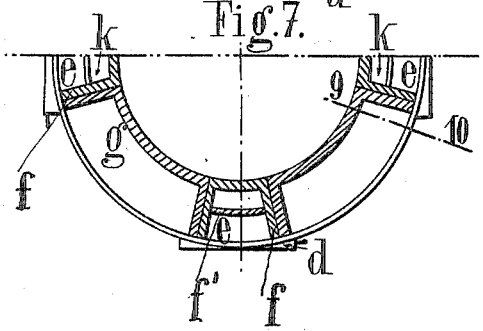
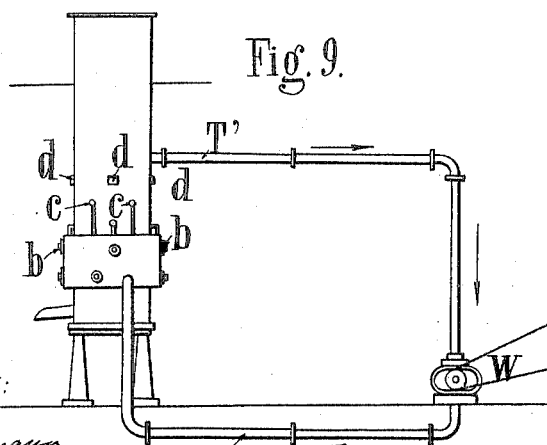
WITNESSES:
Max V. Ordmann
Estelle V. Wale
INVENTOR
Alphonse Baillot
BY
Max V. Ordmann
ATTORNEY

UNITED STATES PATENT OFFICE.

ALPHONSE BAILLOT, OF HAYBES, FRANCE.

CUPOLA.

No. 817,412.     Specification of Letters Patent.     Patented April 10, 1906.

Application filed June 6, 1905. Serial No. 263,955.

*To all whom it may concern:*

Be it known that I, ALPHONSE BAILLOT, a citizen of the Republic of France, and a resident of Haybes, France, have invented new and useful Improvements in and Relating to Cupolas, which improvements are fully set forth in the following specification.

The present invention pertains to improvements in cupola-furnaces, and has for its object to arrange the same in such a manner that the greatest possible economy in fuel employed for effecting the fusion of the metal is rendered possible. To accomplish this object, I arrange means whereby air is injected into the zone situated immediately above the fusion zone, so that the gases furnished by the combustion of the coke, particularly carbonic oxid, tending to escape toward the outlet of the cupola are burned. The carbonic oxid when in contact with the oxygen of the air that is injected through auxiliary twyers enters into combustion and produces an important additional heat, which is utilized for the fusion of the metal. The result is that the rapidity with which the fusion takes place is increased and allows a considerable economy in fuel. Furthermore, I arrange an air-heater at the upper part of the cupola, which is adapted to utilize also the heat lost in other installations and at the same time to exert suction upon the gases that may have escaped combustion in the lower zone. These gases, mixed with air entering through appropriate windows, are drawn by a fan and then forced into the large fusion-twyers. The air introduced through the fusion-twyers being hot instead of cold, also influences the qualities of the fused metal in the crucible of the cupola.

Thus the improvements applied to the cupola consist in injecting directly into the chamber of the twyers and thence into the fusion zone a mixture of hot air and gas, of which the former is obtained in a heater arranged at a convenient height in the cupola.

The injected quantity of air will depend upon the quantity of gas produced in the cupola.

My invention will be more fully understood from the accompanying drawings, in which similar reference-letters denote corresponding parts, and in which—

Figure 4:
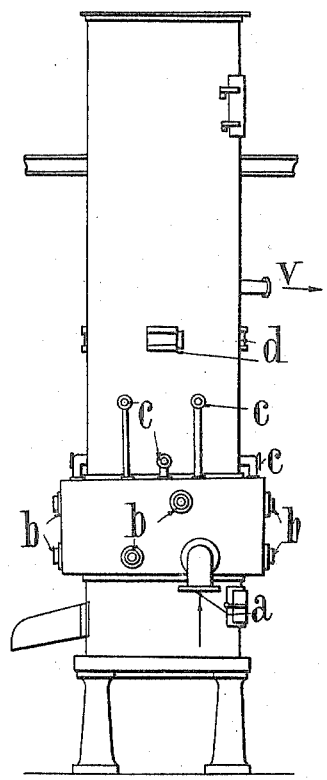
Figure 1:
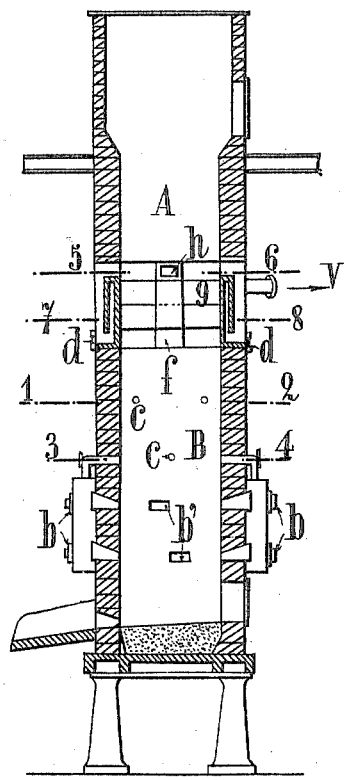
Figure 2:
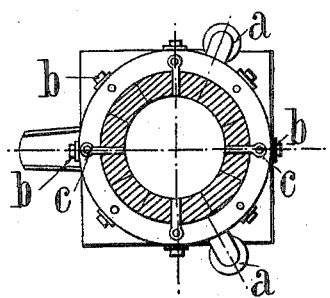
Figure 3:
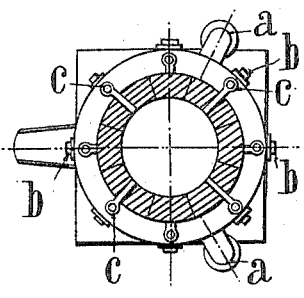

Figure 1 is a sectional elevation of the cupola-furnace; Fig. 2, a cross-section through lines 3 4 of Fig. 1; Fig. 3, a cross-section through lines 1 2 of Fig. 1; Fig. 4, an elevation of the cupola-furnace, showing all the external devices. Fig. 5 is a sectional elevation of the heater. Fig. 6 is a cross-section through line 5 6 of Fig. 5. Fig. 7 is a cross-section through line 7 8 of Fig. 5. Fig. 8 is a sectional elevation through line 9 10 of Fig. 7. Fig. 9 is a general diagram of the installation, showing the action and the path of the air.

With reference to the drawings, A is the shaft of the cupola-furnace, B the fusion zone of the metal, and $b'$ $b'$ the fusion-twyers, which are provided with windows $b$ $b$.

$c$ $c$ $c$ are sets of small air-twyers.

At the upper part of the cupola-furnace a heater R, Figs. 1 to 5, is arranged $d$ $d$ are apertures through which cold or atmospheric air is raised into the heater.

The heater consists of four cast-iron sections $g$, between which four other cast-iron sections $f$ are interposed. The eight compartments are closed up by a cylindrical sheet-metal casing $R'$. The opening of the pipe V is arranged in one of the sections $g$. Each of the sections $f$ is provided with an opening $h$ at its upper part which forms a passage to the outer part of the section $f$. The latter is also provided with baffles $f'$ and has lateral openings $k$, that are in communication with the compartments $g$.

The different phases in the operation of the cupola-furnace are as follows: The fuel introduced into the shaft A, Fig. 1, falls into the fusion zone B, where it kindles in contact with the air injected through the fusion-twyers $b$ $b$ $b'$ $b'$. Owing to the pressure of the air, the gases resulting from the combustion of the coke tend to escape toward the cupola-outlet and are consumed in their passage by the air injected through the first set of small twyers $c$ $c$, Fig. 2. If owing to the diminution of resistance of the gases in the reserve of the fuel and metal constituting the cupola charge the fusion zone tends to rise somewhat, the second set of twyers $c$ $c$, Fig. 3, fulfils the same office as the first set of twyers. The hot air, which always rises toward the furnace-mouth, is seized in its passage and drawn through the apertures $h$ $h$ of the heater R, Figs. 1 to 5, and after having traversed it through the openings $e$ $e$ of the sections $f$ $f$ and the openings $k$ $k$, leading into the section $g$ $g$, Figs. 1, 5, and 6, it escapes through the pipe V and is drawn by the fan W through the pipe $T'$, Fig. 9. The fan W forces the air and the hot gases into the chamber of the twyers $b'$ $b'$ through the pipe T and continues toward the fusion zone.

What I claim, and desire to secure by Letters Patent, is—

1. In a cupola for fusing iron, the arrangement of fusion-twyers, windows for the latter, small air-twyers in stages according to quincunx fashion at a suitable height above the bottom of the furnace, means permitting a double circulation of fluids around the upper part of the central core of the cupola and a regulated admission of air and means for forcing the mixture of hot air and gases produced in the cupola through the fusion-twyers into the fusion zone, substantially and for the purpose as specified.

2. In a cupola for fusing iron the arrangement of fusion-twyers, windows for the latter, small air-twyers in stages at a suitable height above the bottom of the furnace, auxiliary twyers permitting the admission of atmospheric air, a heater comprising interposed hollow sections communicating with each other, baffles, inlets in one set of said hollow sections for the ascending fluids and controllable inlets for atmospheric air to the heater, said heater permitting a circulation of fluids around the upper part of the central core of the cupola and means for forcing the mixture of hot air and gases produced in the cupola through the fusion-twyers into the fusion zone, substantially and for the purpose as specified.

3. In a cupola for fusing iron, the arrangement of fusion-twyers, windows for the latter, small air-twyers in stages at a suitable height above the bottom of the furnace, auxiliary twyers permitting the admission of atmospheric air, a heater comprising interposed hollow sections communicating with each other, baffles, inlets in one set of said hollow sections for the ascending fluids and controllable inlets for atmospheric air to the heater, said heater permitting a circulation of fluids around the upper part of the central core of the cupola a ventilator comprising a suction-pipe terminating in one of the hollow sections of the heater, a suction and forcing fan, and a force-pipe terminating into the chamber of the fusion-twyers, substantially and for the purpose as specified.

4. In a cupola for fusing iron, a heater comprising four hollow sections $g$ and four other hollow sections $f$ interposed between the latter, a cylindrical mantle $R'$ surrounding said sections, openings $h$ at the upper part of the sections $f$, baffle-plates $f'$ in the sections $f$, openings $k$ communicating with the sections $g$ and an opening in one of the sections $g$, a suction-pipe $T'$ communicating with said opening in the section $g$, and a ventilator W connected with the said suction-pipe and adapted to draw the mixture of air and the gases from the heater and force the same through the twyers into the furnace, substantially and for the purpose as specified.

In testimony whereof I have signed this specification in the presence of two subscribing witnesses.

ALPHONSE BAILLOT.

Witnesses:
 ERNEST BAILLOT,
 AUGUST DAM